US008803484B2

(12) United States Patent
Iizuka et al.

(10) Patent No.: US 8,803,484 B2
(45) Date of Patent: Aug. 12, 2014

(54) WIRELESS ENERGY TRANSFER ANTENNAS AND ENERGY CHARGING SYSTEMS

(71) Applicant: Toyota Motor Engineering & Manufacturing North America, Inc., Erlanger, KY (US)

(72) Inventors: Hideo Iizuka, Ann Arbor, MI (US); Jae Seung Lee, Ann Arbor, MI (US); Paul Donald Schmalenberg, Ann Arbor, MI (US); Brian Joseph Robert, St. Clair Shores, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/909,674

(22) Filed: Jun. 4, 2013

(65) Prior Publication Data
US 2013/0265004 A1 Oct. 10, 2013

Related U.S. Application Data

(62) Division of application No. 12/613,791, filed on Nov. 6, 2009, now Pat. No. 8,466,660.

(51) Int. Cl.
*H02J 7/00* (2006.01)
(52) U.S. Cl.
USPC ............................ 320/137; 320/108; 320/109
(58) Field of Classification Search
USPC .......................... 320/108, 109, 137; 455/41.1, 455/343.1–343.6, 573
See application file for complete search history.

(56) References Cited

U.S. PATENT DOCUMENTS

| | | | |
|---|---|---|---|
| 7,288,918 B2 * | 10/2007 | DiStefano | 320/108 |
| 7,311,584 B2 | 12/2007 | Goff | |
| 7,432,622 B2 | 10/2008 | Griepentrog et al. | |
| 7,544,316 B2 | 6/2009 | Stevens et al. | |
| 8,198,858 B2 | 6/2012 | Kim et al. | |
| 8,457,550 B2 * | 6/2013 | Goto et al. | 455/41.1 |
| 2008/0076333 A1 | 3/2008 | Krause et al. | |
| 2008/0238364 A1 | 10/2008 | Weber et al. | |

OTHER PUBLICATIONS

Iizuka, Hideo, Stub- and Capacitor-Loaded Folded Dipole Antenna for Digital Terrestrial TV Reception, IEEE Transactions on Antennas and Propagation, vol. 56, No. 1, Jan. 2008.
Iizuka, Hideo, Varactor-Loaded H-Shaped Antenna with Radiation Pattern Control, IEEE Transactions on Antennas and Propagation, vol. 56, No. 9, Sep. 2008.
Karalis, Aristedis, Efficient Wireless Non-Radiative Mid-Range Energy Transfer, Annals of Physics 323 (2008).
Kurs, Andre, Wireless Power Transfer via Strongly Coupled Magnetic Resonances, Science Magazine, vol. 317, Jul. 6, 2007.

* cited by examiner

*Primary Examiner* — Richard V Muralidar
(74) *Attorney, Agent, or Firm* — Christopher G. Darrow; Young Basile Hanlon & MacFarlane, P.C.

(57) ABSTRACT

A resonant wireless energy transfer system comprises first and second antennas made up of dual parallel wire helixes wherein the wires are terminated by short wires. Voltage controlled variable capacitors are connected into the antennas to permit progressive variation between folded dipole and normal dipole operating modes such that optimum energy transfer can be achieved between the antennas over a wide range of antenna separation distances. A vehicle battery charging system using the above-described antennas is provided including an installation which allows purchase of battery charging power by members of the general public. In-vehicle energy transfer for sensors, computers, cell phones and the like is also described.

4 Claims, 7 Drawing Sheets

D=370MM

D=600MM

D=820MM

US 8,803,484 B2

WIRELESS ENERGY TRANSFER ANTENNAS AND ENERGY CHARGING SYSTEMS

CROSS-REFERENCE TO RELATED APPLICATION

This application is a divisional of the co-pending U.S. patent application Ser. No. 12/613,791 filed Nov. 6, 2009. The content of U.S. patent application Ser. No. 12/613,791 is incorporated herein by reference.

FIELD OF THE INVENTION

This invention relates to resonantly coupled, wireless energy transmission and receiving antennas, and more particularly to vehicle-related energy charging systems using such antennas.

BACKGROUND OF THE INVENTION

Conventional wireless energy transmission from a source antenna to a receiver antenna declines rapidly with distance. This is primarily due to the fixed configuration of the antennas. In general, there are three coupling states, under, critical, and over couplings that are determined by the distance between the antennas. Critical coupling provides the maximum energy transfer efficiency at the distance that is determined by antenna parameters such as antenna radius, length in axis etc. When the distance increases or decreases, the coupling state turns into under coupling or over coupling, resulting in the decrease of efficiency. We have discovered that by progressively changing the transmitting and receiving antenna current distributions, resonant wireless coupling between such antennas having a high degree of energy transfer efficiency can be realized despite significant variations in the distance between the source and receiving antennas, where the distance at critical coupling is changed.

SUMMARY OF THE INVENTION

According to a first aspect of the invention, a wireless energy coupling system comprising a transmitting antenna and a receiving antenna is provided. In accordance with the invention, the transmitting antenna includes a helix of dual parallel interconnected wires and the receiving antenna similarly comprises a helix of dual parallel wires of the same size.

In accordance with a second aspect of the invention, the distance of the maximum energy transfer efficiency between the transmitting and the receiving antennas can be varied in concert through the use of variable capacitors which are connected into and between the dual parallel wires of the antennas to progressively vary the antenna current distributions between normal dipole and folded dipole modes thereby to maintain a resonant energy transfer condition with critical coupling over substantial variations in distance between the two antennas.

In accordance with a third aspect of the invention, a wireless energy coupling system using transmitting and receiving antennas is provided for charging a battery system of an automotive vehicle. In general, the wireless energy source comprises a power source, a converter, a transmitting antenna connected to receive electrical energy from the power source, and control components associated with the antenna for selectively changing the current distributions; i.e., distance of the maximum energy transfer efficiency, thereof to achieve a high efficiency coupling.

In general, an automobile installation comprises an antenna similar to the energy source antenna and coupled through suitable circuitry, such as a power converter, to a battery or bank of batteries. The vehicle antenna is also provided with control components for selectively changing the configuration thereof to achieve a high efficiency energy coupling with a source antenna, which coupling is achieved despite substantial variation in the distance between antennas.

In an illustrative system hereinafter described in detail, the antennas include ways to communicate data and control signals between them so as to permit configuration; i.e., length, changes to be carried out in concert as well as to tell the source how effective the coupling is at any given time.

In the preferred form, each antenna comprises a helix of dual parallel wires terminated by short wires; i.e., the ends of dual parallel wires are electrically connected. Through the use of multiple varactors in circuit with the helixes; i.e., voltage controlled variable capacitors, the configurations of the antennas can be changed thereby to accommodate substantial variations in distance between the antennas without the loss of resonant coupling conditions.

In accordance with a preferred form of this third aspect of the invention, a commercial battery charging station is provided so that a vehicle battery charge procedure may be purchased. This station may include a coin or bill acceptor, a credit card reader, and/or wireless verification from vehicle subscription system for carrying out a financial payment transaction. This device is connected to activate a power source which in turn activates the transmitting antenna. In accordance with a preferred embodiment of the invention, the system is tested from time to time to determine that at effective energy transfer is occurring and a shut down or power reduction function is triggered in the event the energy transfer is below expected levels.

BRIEF DESCRIPTION OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENTS

Figure 1:
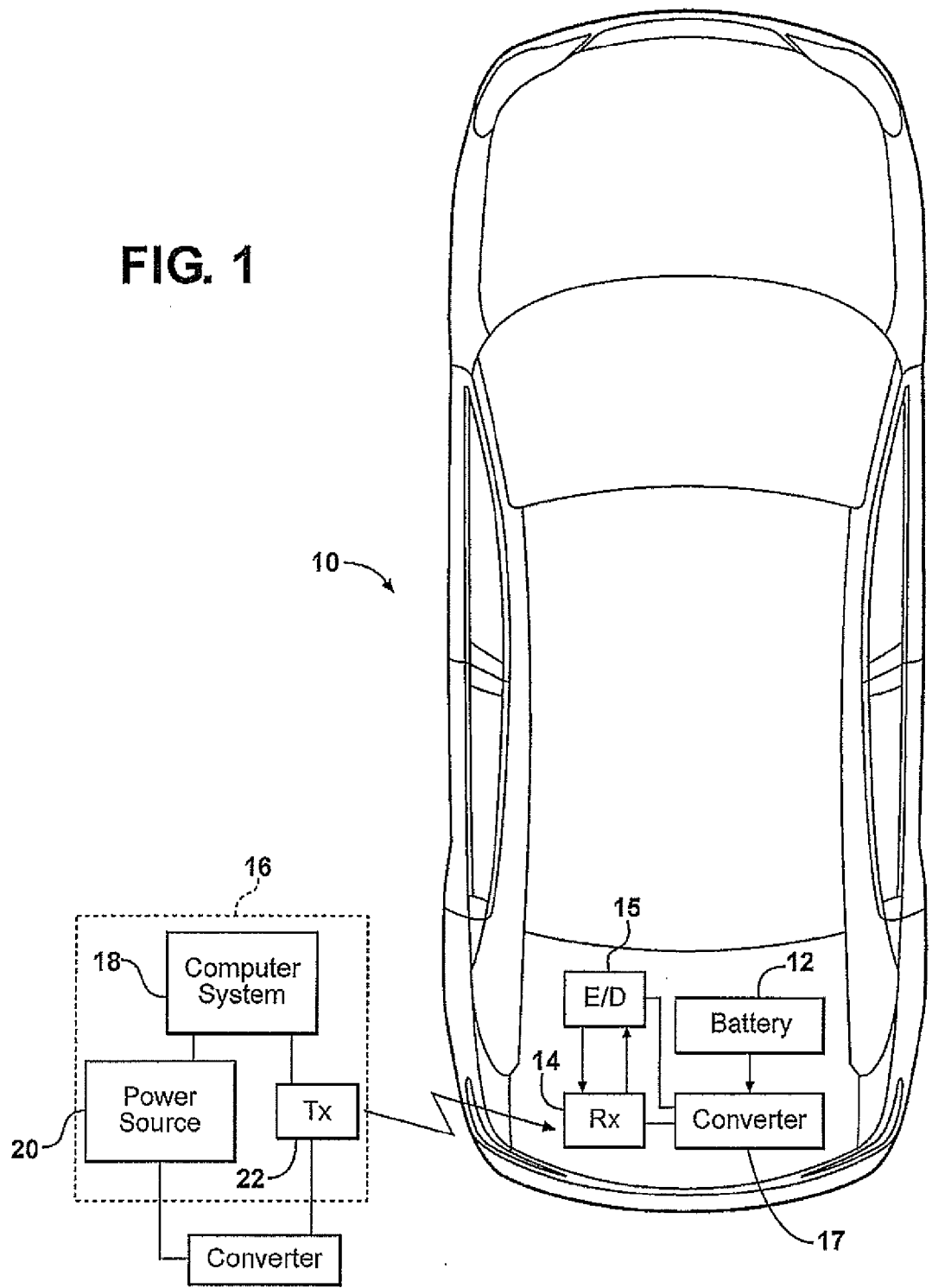
FIG. 1 is a schematic diagram of a vehicle using a commercial vehicle battery charging system according to the invention.

Referring to FIG. 1, there is shown an automotive vehicle 10 with a propulsion system including a battery 12. It will be understood that the battery 12 may represent a single battery or multiple batteries connected in a bank and that such batteries may use conventional lead acid technology or metal hydride technology or any other technology but, in all cases, require periodic charging to maintain effective energy levels and range for vehicle 10. The propulsion system of the vehicle may be all electric, or a hybrid combination of electric and internal combustion.

Also packaged into the vehicle 10 at a selected location such as the left rear corner is a receiving antenna 14 which is coupled to the battery 12 in energy transfer relation through a power converter 17 as hereinafter described in greater detail. The vehicle also carries an encoder/decoder module 15 connected to antenna 14 for purposes to be described.

FIG. 1 also shows a station 16 from which charging energy for vehicle batteries may be purchased. Station 16 comprises a computer 18 capable of carrying out payment and computation functions. Computer 18 may, in one exemplary form, comprise a coin and/or bill acceptor, a card reader, and a timer wherein the computer 15 is programmed to operate in accordance with the flow diagram of FIG. 8.

The station 16 further comprises a power source 20 which may be connected to a public utility or a private generator/source. Source 20 is connected via converter to a transmitting antenna 22 which can be wirelessly coupled to the receiving antenna 14 for energy transfer purposes when vehicle 10 is parked nearby as hereinafter described. Although not illustrated in FIG. 1, it will be understood that the station 16 may be placarded with instructions, cautionary statements and devices or indicia for helping the driver of vehicle 10 position the vehicle relative to the station in the optimum place to achieve the charging function. Moreover, the antenna 22, alone or with other components of the station 16 may be adjustable in position. However, as hereinafter described, an aspect of the invention relaxes the criticality of establishing a fixed distance between antennas 14, 22 for effective charging.

Figure 2:
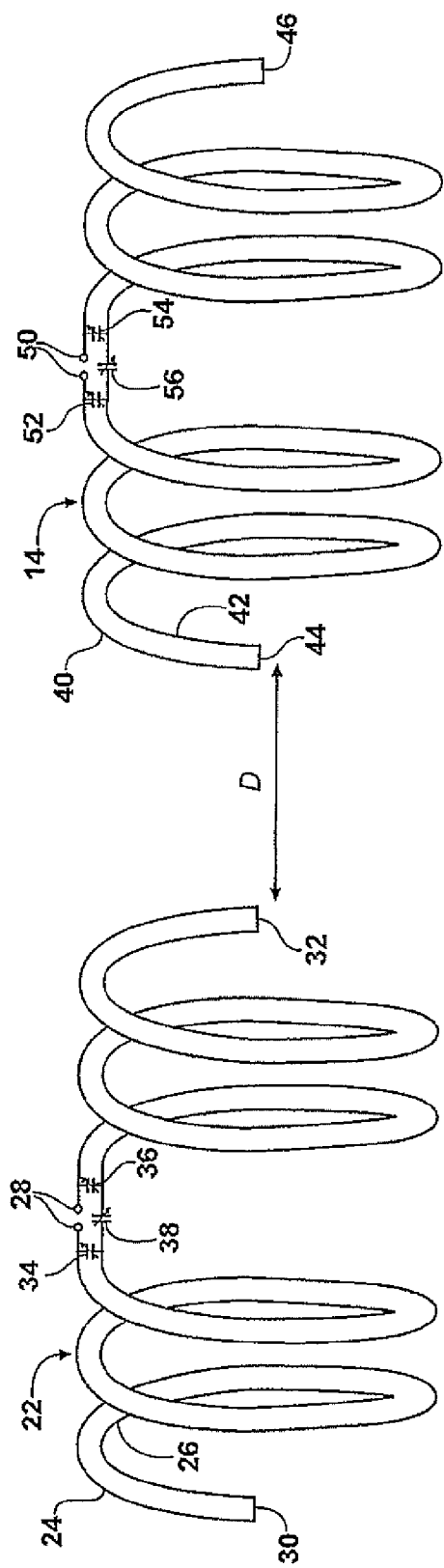
FIG. 2 is a schematic diagram of a dual parallel wire helix system constituting the transmitting and receiving antennas.

Referring now to FIG. 2, the physical nature of the transmitting antenna 22 and the receiving antenna 14 is illustrated in detail. The transmitting antenna 22 comprises a helix of dual parallel wires 24, 26 designed to operate at a frequency of 10 MHz and having a central feed point represented by contacts 28 which are connected to the power source 20 shown in FIG. 1. The wires 24, 26 making up the dual wire helix are terminated at the ends by short wires 30, 32. The term "short" as used herein means electrical connection between the ends of wires 24, 26. In practice, the diameter of antennas 22 and 14 is about 50 cm.

Within the dual wire helix 22 are voltage-controlled, variable capacitors or "varactors" 34, 36, 38 of which varactor 34 is connected across the wires 24, 26 to the left of one of the feed point contacts, varactor 36 is connected across the wires 24, 26 to the right of the feed point contacts 28, and varactor 38 is connected in series with the wire 26 between the lower ends of the varactors 34, 36. The overall effect of the varactors 34, 36, 38 is to effect a change in the configuration of the transmitting antenna 22 between a first folded dipole mode as shown in FIG. 3B and a second normal dipole mode as shown in FIG. 3C. It will be understood that although single varactors are shown in the various positions, the full range of configurational changes needed may require multiple varactors connected in parallel at each location.

Referring again to FIG. 2, receiving antenna 14 is substantially identical to transmitting antenna 22 and is made up of a helix of dual parallel wires 40, 42 terminated by short wires 44, 46. The wires 40, 42 have a feed point represented by contacts 50 which contacts are connected to the converter 17 and from there to the battery 12 in the arrangement of FIG. 1.

The converter 17 converts antenna power from AC to controlled DC and may employ known technology used in, for example, marine and RV applications.

Figure 3A:
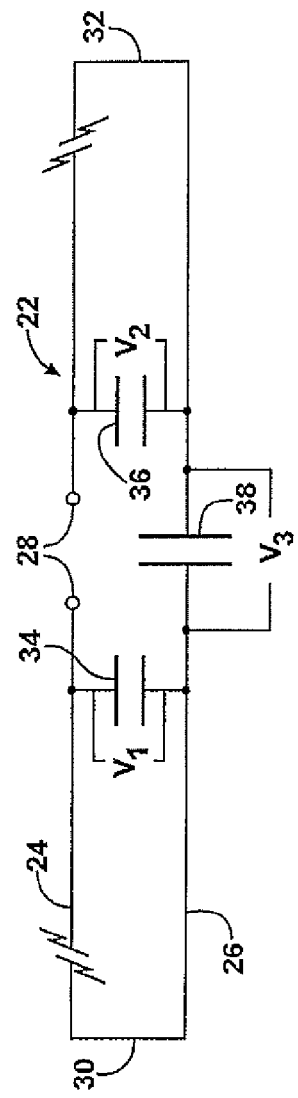
FIGS. 3A, 3B and 3C are schematic diagrams showing an antenna in developed form and showing two modes which are possible through the appropriate control of varactors coupled to and between the wires of the antenna.
Figure 3B:
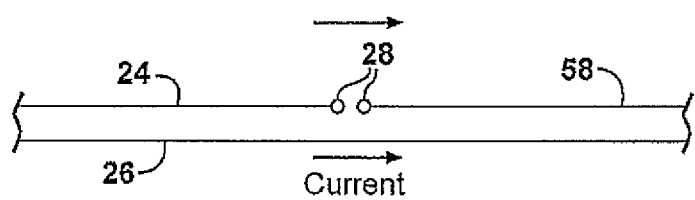
Figure 3C:
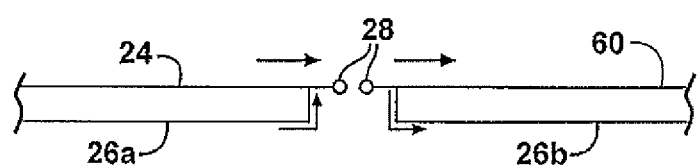

Similarly to the transmitting antenna 22, varactors 52, 54, 56 are connected to and between the wires 40, 42 of antenna 14 so as to permit switching between the folded dipole and normal dipole modes as shown in FIG. 3. Again, varactors 52, 54, 56 may be implemented as multiple capacitors connected in parallel.

The antennas 22, 14 are shown a distance D apart which distance varies according to how close the driver of the vehicle 10 parks the vehicle 10 relative to the antenna 22 in the fixed installation 16 and how much, if at all, antenna 22 can be adjusted in position. It is an object of the present invention to permit significant variations in the distance between antennas 14, 22, thus relaxing the requirements for precise parking of the vehicle 10 relative to the fixed installation 16 and/or precise location of antenna 22. The invention contemplates, however, that suitable markings and other parking aids may be used to substantially align the location of the vehicle 10 where the receiving antenna 14 is found with an appropriately marked area showing the location of the transmitting antenna 22 on the fixed installation 16. While the antenna 22, 14 are denominated as "transmitting" and "receiving" herein, they are equally capable of both functions and are used in this way for data transfer as hereinafter explained.

Referring to FIG. 3, which shows only the transmitting antenna 22 but is equally representative of the receiving antenna 14, the top circuit drawing 3A shows variable DC voltage sources V1, V2, V3 connected across the varactors 34, 36, 38, respectively for varying the capacitances of the respective varactors to a time-varying current flow in the antenna wires. When varactors 34, 36 appear more as open circuits and varactor 38 appears more as a short circuit, the dual wire antenna 22 tends to assume the folded dipole mode shown in FIG. 3B and represented by a continuous current loop 58. On the other hand, when the voltage sources V1, V2, V3 are modified so that varactors 34, 36 appear more as short circuits and varactor 38 appears more as an open circuit, the antenna 22 assumes the normal dipole mode shown in FIG. 3C wherein loops 26a and 26b appear on the left and right sides of the feed point contacts 28.

The voltage sources V1, V2, V3 are chosen to permit progressive and/or incremental variations between the two dipole modes, thus permitting the resonant condition of the present invention to be maintained despite changes in the distance D between the antennas 22, 14 which would otherwise detune the circuits away from the resonant coupled condition and produce a significant drop off in the efficiency of energy transfer. By progressively changing the current distributions between folded and normal dipole modes, a resonant wireless coupling can be optimized for virtually any distance over substantial range of distances between the antennas 22, 14. It will be understood by those familiar with antenna theory that the folded dipole configuration is used for greater values of D whereas the normal dipole is used for smaller values of D, and that the antennas can assume intermediate configurations for respective values of D.

Figure 4:
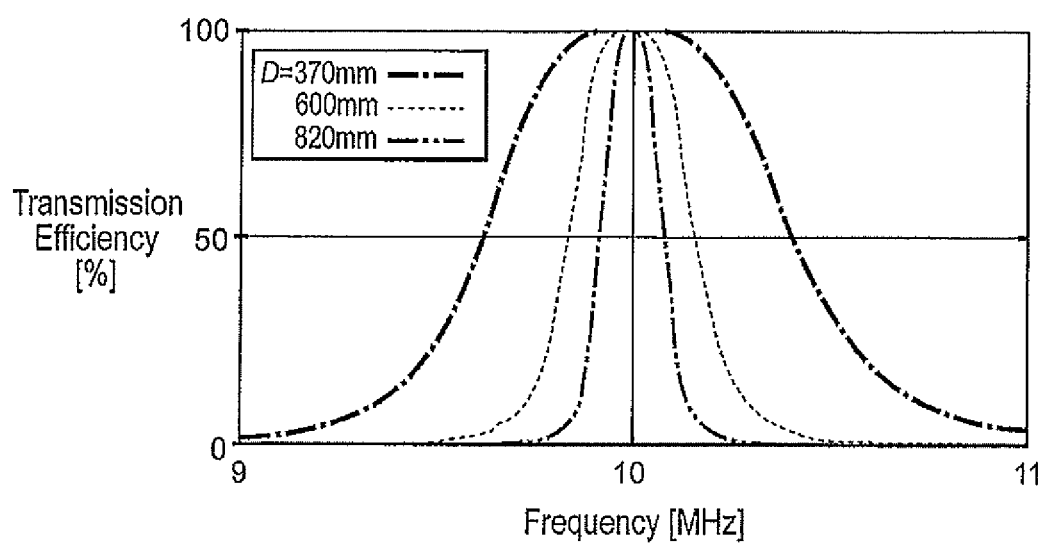
FIG. 4 is graph of transmission efficiency vs. frequency for three distances of 370 mm, 600 mm, and 820 mm.
Figure 5A:
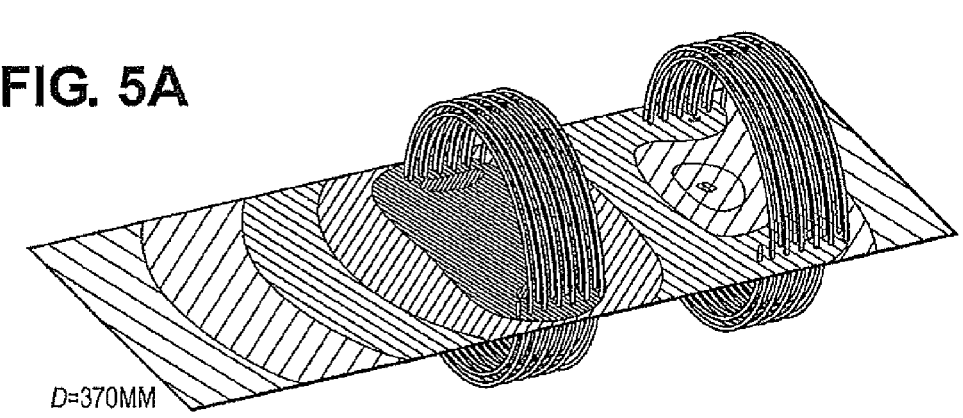
FIG. 5 ($a$)-($c$) are magnetic field distributions at 10 MHz at 370 mm, 600 mm, and 820 mm.
Figure 5A:
Figure 5B:
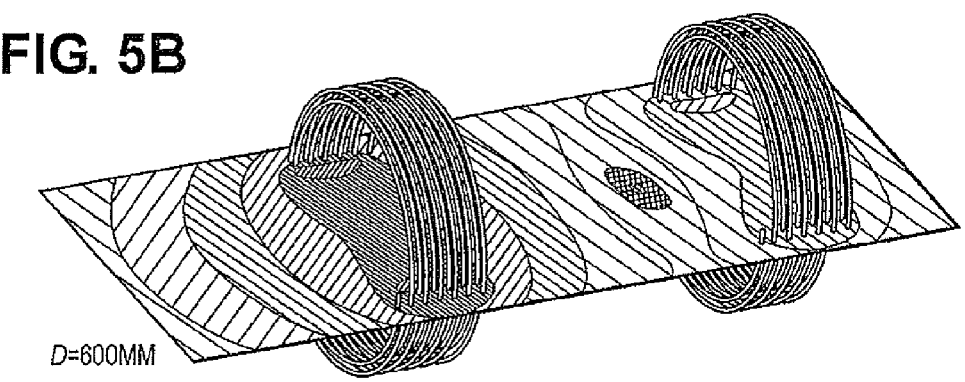
Figure 5B:
Figure 5C:
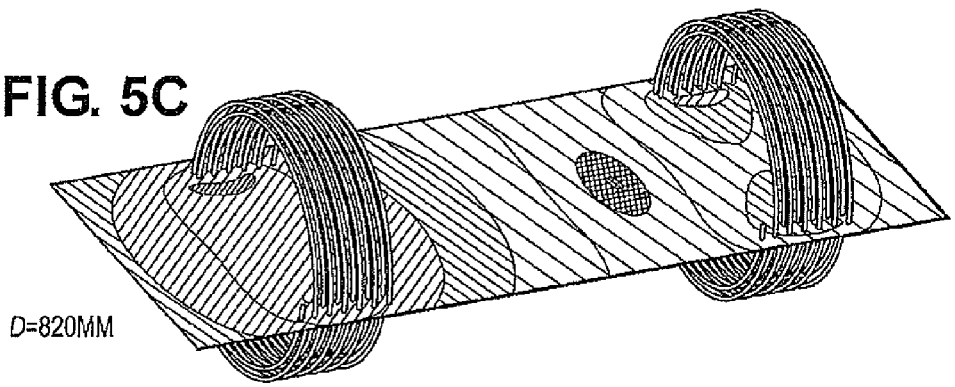
Figure 5C:
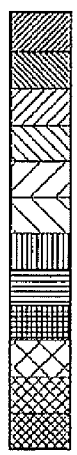

FIG. 4 shows transmission efficiency vs. frequency at three distances of 370 mm, 600 mm, and 820 mm. Transmission efficiency higher than 99% was achieved at 10 MHz for the three cases. Although bandwidth becomes narrower with increasing the antenna distance, the frequency can be tuned to 10 MHz with easy in this configuration.

FIG. 5 (a)-(c) show magnetic field distributions of the three cases at 10 MHz. It can be seen that magnetic field couples between transmitting and receiving antennas for the three cases.

Figure 6:
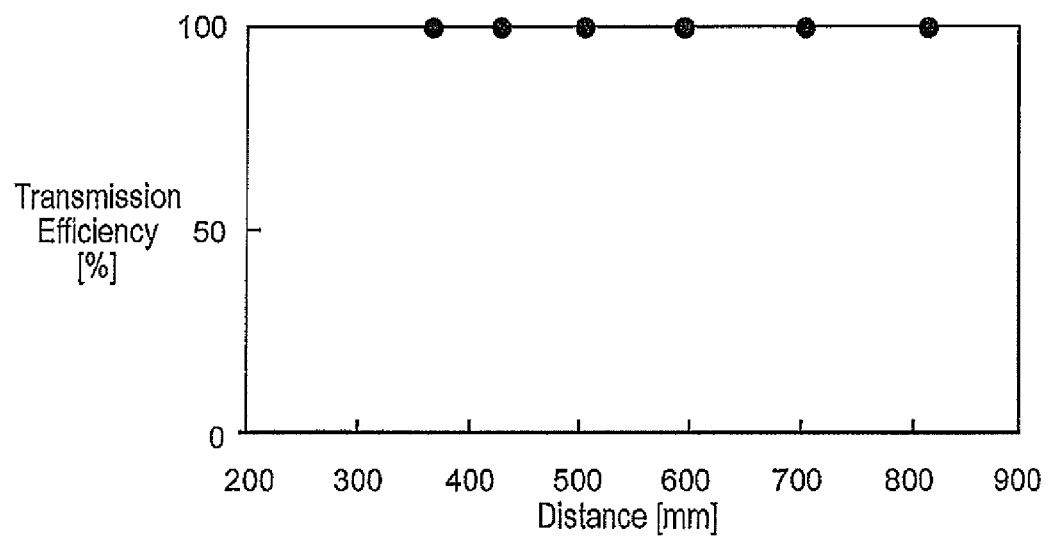
FIG. 6 is graph of transmission efficiency vs. distance at 10 MHz.

In antenna mechanism in FIG. 3, folded dipole mode or normal dipole mode has been described. Not only either mode but also the combined modes can provide the maximum energy transfer efficiency when the distance continuously changes. FIG. 6 shows transmission efficiency vs. distance at 10 MHz. It can be seen that transmission efficiency is higher than 99% throughout the distance from 370 mm to 820 mm.

Figure 7:
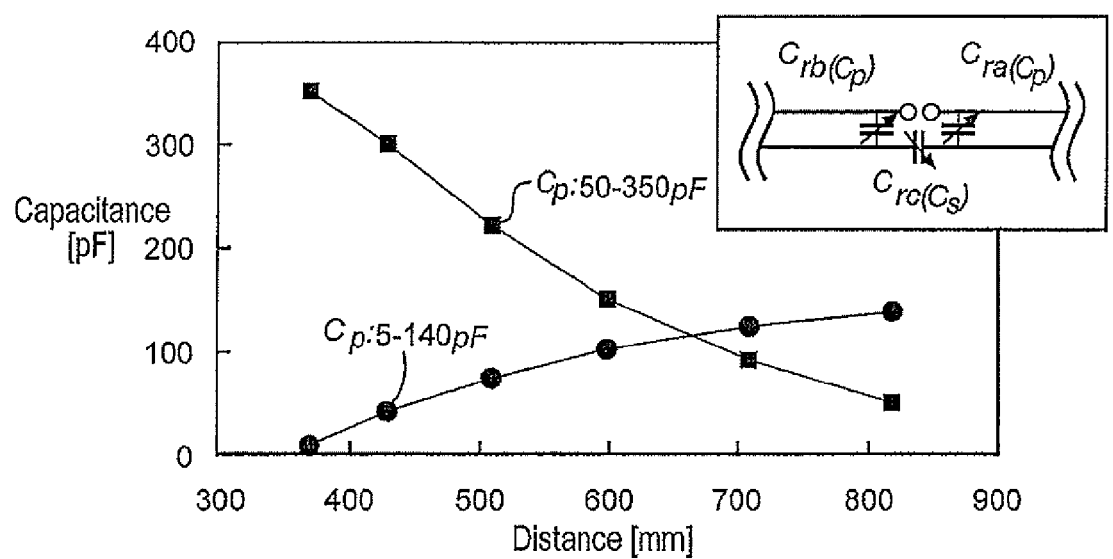
FIG. 7 is graph of capacitances of varactors vs. distance.

Capacitances of varactors were properly changed to achieve the maximum efficiency at each distance. FIG. 7 shows capacitances of varactors vs. distance. Capacitors 34, 36 varied from 350 pF to 50 pF, whilst capacitor 38 varied from 5 pF to 140 pF with increasing distance from 370 mm to 820 mm.

Figure 8:
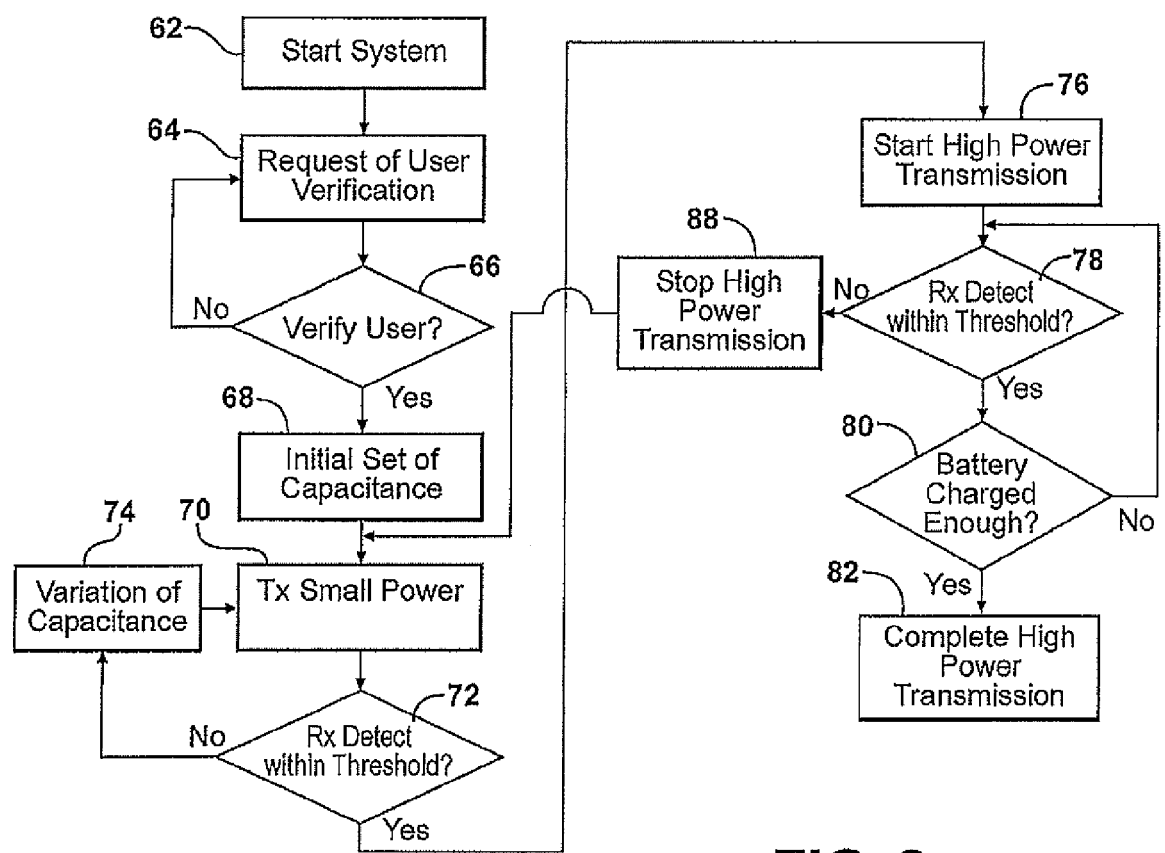
FIG. 8 is a flow chart of a method of operating the system of FIG. 1.

Referring now to FIG. 8, the computer in the fixed installation 16 is programmed to operate in accordance with the flow chart represented by FIG. 8. Upon receipt of an appropriate payment, source 20 is activated at a low level as represented by block 62. A user verification function 64 is provided to make sure that the vehicle is actually is in position so that a spurious start of the installation 16 with no vehicle present does not occur. If the presence of a legitimate user vehicle is not verified at 66, the request function is recycled until such time as a "yes" indication occurs. The system can be configured to limit the number of loops between blocks 66, 64 before shutting down. Vehicle pressure can be verified by known optical and/or electronic devices, e.g., cameras and proximity switches.

Assuming a "yes" indication results from verification block 66, the varactors 34, 36, 38 are set to an initial value by means of the voltage sources V1, V2, V3 (block 68). The initial varactor settings can be arbitrary or, to effect a potential time savings, chosen to correspond to the settings found effective for the immediately preceding power purchase transaction. The varactors 52, 54, 56 in the vehicle-mounted receiving antenna 14 must be set to the same values as varactors 34, 36, 38 so that the two antennas assume the same configuration. To accomplish this, a signal representing the setting value is encoded by computer 18 and sent over the antenna 22 signal to antenna 14 where it is decoded by encoder-decoder 15 and used to set the voltage sources associated with varactors 52, 54, 56. This procedure is represented by block 74. Converter 17 outputs a DC current level representing the power level in receiver antenna 14. Converter 17 is connected to encoder/decoder 15 to send data back to computer 18 representing the received power level. As shown in block 72, if a wireless coupling of 90% is not detected, the variable voltage sources on both sides of the wireless antenna system represented by FIG. 1 are reset to modify the values of the capacitors as between the dipole antenna modes as shown in block 74 until 90% transfer test has been satisfied.

When the 90% test is satisfied, the system switches to a high power transmission mode as shown in block 76. Again, block 78 shows a monitoring of the power transfer function. If at any time the 90% power transfer requirement is not satisfied, block 80 will stop the high power transmission. For example, if a person or an animal were to come between the antennas 22, 14 this could not only be dangerous to the person or animal, but also interfere with the transmission function and this causes an immediate reduction from the high power to the low power condition or, alternatively, shut the system off entirely.

Assuming the high efficiency energy transfer is detected, the system continues to function until the condition block 72 indicates that the battery 12 has been fully charged, at which time block 82 is reached and the system shuts down until another payment is made. If the battery charge condition shows up less than full, the loop made up of blocks 78, 80 continues to cycle until the battery is fully charged or time runs out.

Figure 9:
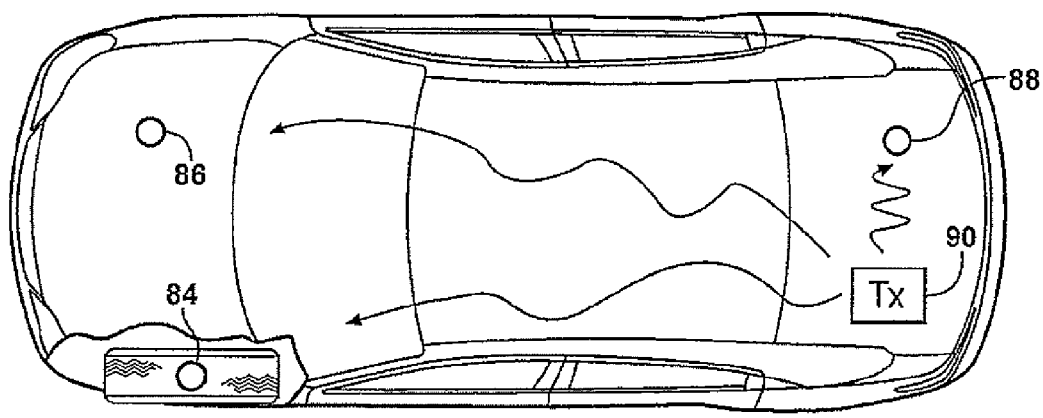
FIG. 9 is schematic illustrate of in-vehicle sensor network charge system.

FIG. 9 shows additional applications of the basic power transfer invention of the basic power transfer invention used, in this case, for in-vehicle power transfer. The vehicle has tire pressure sensors 84, an O2 sensor 86 and a battery monitor sensor 88. All of these sensors can act as signal sources or transducers for wireless in-vehicle data transmission in known manners. Further, all such sensors 84, 86, 88 are in locations where establishing a hard-wired battery connection is difficult or disadvantageous.

Accordingly, the vehicle is equipped with its own energy transmitting source 90 with a dual-coil helix-like antenna 22 in FIG. 2 and each sensor is equipped with an antenna like antenna 14 of FIG. 2. Each sensor may have a battery which is charged by radiative coupling, but may also be batteryless so as to operate directly from the transmitted energy. Because the distances can be fixed, tuning capacitors may not be needed. Similarly, the testing steps described in the flow chart of FIG. 8 may not be needed.

Figure 10:
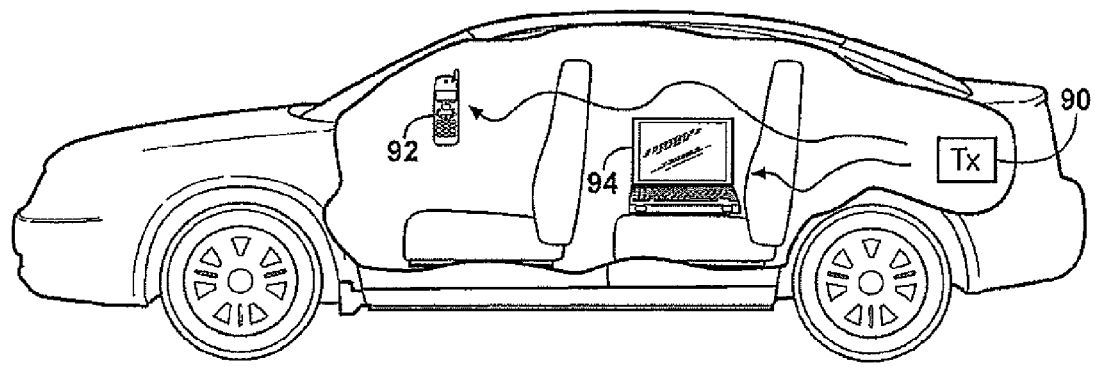
FIG. 10 is schematic illustrate of in-vehicle device charge system.

FIG. 10 shows another in-vehicle application wherein transmitter antenna 90 or another antenna of similar configuration is used to transfer power to the batteries of cell phone 92 and portable laptop computer 94. Although not shown, it will be understood that each device 92, 94 is equipped to receive transmitted power in the manner described herein.

Other applications of the present invention will become apparent to those skilled in the art when the following description of the best mode contemplated for practicing the invention is read in conjunction with the accompanying drawings.

What is claimed is:

1. A method of charging a battery in a transportable power using device from a fixed power delivery location comprising the steps of:
   (a) activating a transmitting antenna at the power delivery location at a low power level;
   (b) testing to determine that power is being transferred from the delivery location antenna to a receiving antenna associated with the power using device; and
   (c) upon determining that power is being transferred at or above a predetermined level, increasing the power level at the delivery location.

2. The method of claim 1 including the further step of actively configuring the transmitting and receiving antennas in concert to maximize power transfer by resonant coupling.

3. The method of claim 2 wherein the antennas are of substantially identical configuration and are reconfigurable as between folded dipole configurations to accommodate differing distances between the antennas.

4. The method of claim 1 wherein the delivery location is a vehicle charging location placarded to designate vehicle location and having a user-initiated input device, and the power using device is a vehicle.

* * * * *